United States Patent
Comer et al.

(10) Patent No.: US 12,347,168 B1
(45) Date of Patent: Jul. 1, 2025

(54) SYSTEM AND METHOD FOR CLASSIFYING IMAGES WITH A COMBINATION OF NEAREST-NEIGHBOR-BASED LABEL PROPAGATION AND KERNEL PRINCIPAL COMPONENT ANALYSIS

(71) Applicant: HRL Laboratories, LLC, Malibu, CA (US)

(72) Inventors: Joseph Comer, Portland, OR (US); Heiko Hoffmann, Simi Valley, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 413 days.

(21) Appl. No.: 18/086,460

(22) Filed: Dec. 21, 2022

Related U.S. Application Data

(60) Provisional application No. 63/315,920, filed on Mar. 2, 2022.

(51) Int. Cl.
*G06V 10/764* (2022.01)
*G06V 10/44* (2022.01)
*G06V 10/774* (2022.01)
*G06V 10/82* (2022.01)

(52) U.S. Cl.
CPC ............ *G06V 10/764* (2022.01); *G06V 10/44* (2022.01); *G06V 10/7753* (2022.01); *G06V 10/82* (2022.01)

(58) Field of Classification Search
CPC ...... G06V 10/764; G06V 10/82; G06V 10/44; G06V 10/7753
See application file for complete search history.

(56) References Cited

PUBLICATIONS

Zhuo et al, "Cascaded Dimension Reduction for Effective Anomaly Detection", 2021, IEEE International Conference on Big Data (Big Data), pp. 4480-4490 (11 Pages) (Year: 2021).*
Chapel et al, "Anomaly Detection with Score Functions Based on the Reconstruction Error of the Kernel PCA", 2014, ECML PKDD 2014, Part I, LNCS 8724, pp. 227-241 (Year: 2014).*
Zhang et al, "Face Recognition Algorithm Based on Kernel Collaborative Representation Collaborative Representation", 2013, Advanced Materials Research ISSN: 1662-8985, vols. 756-759, pp. 3590-3595 (Year: 2013).*
Heiko Hoffmann. "Kernel PCA for novelty detection," Pattern Recognition, 40(3): pp. 863-874, 2007.
Jake Snell, Kevin Swersky, and Richard S. Zemel. "Prototypical networks for few-shot learning," pp. 1-11, 2017.

(Continued)

*Primary Examiner* — David F Dunphy
(74) *Attorney, Agent, or Firm* — TOPE-MCKAY & ASSOCIATES

(57) ABSTRACT

Described is a system for detecting and classifying new patterns of objects and images for applications where labeled data is scarce. In operation, the system trains a neural network with unlabeled images and extracts features with the neural network from both the unlabeled images and a set of labeled images to generate a feature space. Labels are propagated in the feature space using nearest neighbors, allowing for modeling of a per-class simplified distribution. An object in a new test image can then be classified using reconstruction error based on the per-class simplified distributions.

21 Claims, 8 Drawing Sheets

(56) References Cited

PUBLICATIONS

Simon, C., Koniusz, P., Nock, R., and Harandi, M., "Adaptive subspaces for few-shot learning," In 2020 IEEE/CVF Conference on Computer Vision and Pattern Recognition (CVPR), pp. 4135-4145, 2020.

Oriol Vinyals, Charles Blundell, Timothy Lillicrap, Koray Kavukcuoglu, and Daan Wierstra. "Matching networks for one shot learning," In D. Lee, M. Sugiyama, U. Luxburg, I.Guyon, and R. Garnett, editors, Advances in Neural Information Processing Systems, vol. 29. Curran Associates, Inc., 2016, 30th Conference on Neural Information Processing Systems (NIPS 2016), Barcelona, Spain, pp. 1-9.

Dengyong Zhou, Olivier Bousquet, Thomas Lal, Jason Weston, and Bernhard Scholkopf. "Learning with local and global consistency." In S. Thrun, L. Saul, and B. Schoelkopf, editors, Advances in Neural Information Processing Systems, vol. 16. MIT Press, 2004, pp. 1-8.

Ahmet Iscen, Giorgos Tolias, Yannis Avrithis, and Ondrej Chum. "Label propagation for deep semi-supervised learning," In Proceedings of the IEEE/CVF Conference on Computer Vision and Pattern Recognition (CVPR), Jun. 2019, pp. 5065-5074.

Yanbin Liu, Juho Lee, Minseop Park, Saehoon Kim, and YiYang. "Learning to propageate labels: Transductive propagation network for few-shot learning," International Conference on Learning Representations (ICLR), 2019, pp. 1-14.

Barbara Caroline Benato, Jancarlo Ferreira Gomes, Alexandru Cristian Telea, and Alexandre Xavier Falcao. "Semi-supervised deep learning based on label propagation in a 2D embedded space," CoRR, abs/2008.00558, 2020, pp. 1-12.

Li, C., Yang, J., Zhang, P., Gao, M., Xiao, B., Dai, X., Yuan, L., Gao, J., "Efficient self-supervised vision transformers for representation learning," ICLR 2022, pp. 1-27.

Mathilde Caron, Hugo Touvron, Ishan Misra, Herve Jegou, Julien Mairal, Piotr Bojanowski, and Armand Joulin. "Emerging properties in self-supervised vision transformers," 2021, pp. 1-21.

Sylvain Gugger and Jeremy Howard. "AdamW and Superconvergence is now the fastest way to train neural nets," https:llwww.fast.ai/ posts/2018-07-02-adam-weight-decay.html, Published Jul. 2, 2018, Downloaded Dec. 21, 2022, pp. 1-9.

Bernhard Schoelkopf, Alexander Smola, and Klaus-Robert Mueller. "Nonlinear component analysis as a kernel eigenvalue problem," Neural Computation, 10 : pp. 1299-1319, 1998.

Joseph F Comer, Philip L Jacobson, and Heiko Hoffmann, "Few-Shot Image Classification Along Sparse Graphs," arXiv:21 12.03951v1, Dec. 7, 2021, pp. 1-12.

Ruixiang Zhang, Tong Che, Zoubin Ghahramani, Yoshua Bengio, and Yangqiu Song. Metagan: An adversarial approach to few-shot learning. In S. Bengio, H. Wallach, H. Larochelle, K. Grauman, N. Cesa-Bianchi, and R. Garnett, editors, Advances in Neural Information Processing Systems, vol. 31. Curran Associates, Inc., 2018, pp. 1-10.

Yonglong Tian, Yue Wang, Dilip Krishnan, Joshua B Tenenbaum, and Phillip Isola. Rethinking few-shot image classification: a good embedding is all you need? In European Conference on Computer Vision, pp. 266-282. Springer, 2020.

Jialin Liu, Fei Chao, and Chih-Min Lin. Task augmentation by rotating for meta-learning. arXiv preprint arXiv:2003.00804, 2020, pp. 1-9.

Junyuan Xie, Ross Girshick, and Ali Farhadi. Unsupervised deep embedding for clustering analysis. In International conference on machine learning, pp. 478-487. PMLR, 2016.

Dengyong Zhou, Olivier Bousquet, Thomas Lal, Jason Weston, and Bernhard Scholkopf. Learning with local and global consistency. Advances in neural information processing systems, 16, 2003, pp. 1-8.

Ahmet Iscen, Giorgos Tolias, Yannis Avrithis, and Ondrej Chum. Label propagation for deep semi-supervised learning. In Proceedings of the IEEE/CVF Conference on Computer Vision and Pattern Recognition, pp. 5070-5079, 2019.

Ruibing Hou, Hong Chang, Bingpeng Ma, Shiguang Shan, and Xilin Chen. Cross attention network for few-shot classification. Advances in Neural Information Processing Systems, 32, 2019, pp. 1-12.

Jiawei Ma, Hanchen Xie, Guangxing Han, Shih-Fu Chang, Aram Galstyan, and Wael Abd-Almageed. Partner-assisted learning for few-shot image classification. In Proceedings of the IEEE/CVF International Conference on Computer Vision, pp. 10573-10582, 2021.

Barbara C Benato, Jancarlo F Gomes, Alexandre C Telea, and Alexandre Xavier Falcao. Semi-supervised deep learning based on label propagation in a 2d embedded space. In Iberoamerican Congress on Pattern Recognition, pp. 371-381. Springer, 2021.

Joseph F Comer, Philip L Jacobson, and Heiko Hoffmann. Few-shot image classification along sparse graphs. In Proceedings of the IEEE/CVF Conference on Computer Vision and Pattern Recognition, pp. 4187-4195, 2022.

* cited by examiner

Table 1

| Dataset | Pretraining | Linear | LP+Linear | LP+KPCA |
|---|---|---|---|---|
| NWPU-RESISC45 | EsViT | 76.56 ± 0.0 | 72.72 ± 0.0 | 82.67 ± 0.0 |
| | Pretrained ResNet18 | 61.99 ± 0.0 | 70.70 ± 0.0 | 71.55 ± 0.0 |
| EuroSat | EsViT | 68.14 ± 0.0 | 72.72 ± 0.0 | 84.58 ± 0.0 |
| | Pretrained ResNet18 | 63.48 ± 0.0 | 67.94 ± 0.0 | 65.10 ± 0.0 |
| CropDisease | EsViT | 74.84 ± 0.0 | 75.73 ± 0.0 | 77.99 ± 0.0 |
| | Pretrained ResNet18 | 70.97 ± 0.0 | 78.91 ± 0.0 | 79.00 ± 0.0 |

FIG. 7A

Table 2

| Dataset | Pretraining | Linear | LP+Linear | LP+KPCA |
|---|---|---|---|---|
| NWPU-RESISC45 | EsViT | 82.70 ± 0.0 | 85.50 ± 0.0 | 86.15 ± 0.0 |
| | Pretrained ResNet18 | 73.99 ± 0.0 | 77.88 ± 0.0 | 78.04 ± 0.0 |
| EuroSat | EsViT | 76.00 ± 0.0 | 80.49 ± 0.0 | 83.81 ± 0.0 |
| | Pretrained ResNet18 | 72.56 ± 0.0 | 73.24 ± 0.0 | 77.5 ± 0.0 |
| CropDisease | EsViT | 83.68 ± 0.0 | 83.55 ± 0.0 | 85.49 ± 0.0 |
| | Pretrained ResNet18 | 81.62 ± 0.0 | 83.83 ± 0.0 | 85.26 ± 0.0 |

FIG. 7B

Table 3

| Dataset | Pretraining | Linear | LP+Linear | LP+KPCA |
|---|---|---|---|---|
| NWPU-RESISC45 | EsViT | 90.08 ± 0.0 | 90.44 ± 0.0 | 91.236 ± 0.0 |
| | Pretrained ResNet18 | 83.91 ± 0.0 | 84.82 ± 0.0 | 86.53 ± 0.0 |
| EuroSat | EsViT | 89.74 ± 0.0 | 88.24 ± 0.0 | 82.81 ± 0.0 |
| | Pretrained ResNet18 | 76.37 ± 0.0 | 81.32 ± 0.0 | 87.32 ± 0.0 |
| CropDisease | EsViT | 91.44 ± 0.0 | 91.72 ± 0.0 | 93.29 ± 0.0 |
| | Pretrained ResNet18 | 90.57 ± 0.0 | 90.54 ± 0.0 | 91.97 ± 0.0 |

FIG. 7C

SYSTEM AND METHOD FOR CLASSIFYING IMAGES WITH A COMBINATION OF NEAREST-NEIGHBOR-BASED LABEL PROPAGATION AND KERNEL PRINCIPAL COMPONENT ANALYSIS

CROSS-REFERENCE TO RELATED APPLICATIONS

This application claims the benefit of and is a non-provisional patent application of U.S. Ser. No. 63/315,920, filed on Mar. 2, 2022, the entirety of which is hereby incorporated by reference.

GOVERNMENT RIGHTS

This invention was made with government support under U.S. Government Contract Number FA8750-19-C-0098. The government has certain rights in the invention.

BACKGROUND OF INVENTION

(1) Field of Invention

The present invention relates to image classification and, more specifically, to a system for classifying images using a combination of nearest-neighbor-based label propagation and kernel principal component analysis.

(2) Description of Related Art

Image classifiers ideally require training based on a comprehensive dictionary of pre-labeled images. While such a scenario is ideal, in the real-world, such comprehensively labeled images may not be available. Thus, attempts have been made to devise systems capable of few-shot learning. Few-shot learning is a process of classifying new data when there are only a few training samples available with supervised information.

For few-shot learning, a subset of methods deals with different means for mapping from the feature space onto the image classes. Examples of this approach are ProtoNets and AdaptiveSubspaces (see the List of Incorporated Literature References, Literature Reference Nos. 2 and 3, respectively). ProtoNets was introduced as an improvement over the MatchingNets (as described in Literature Reference No. 4), which is a popular few-shot learning technique. Alternatively, AdaptiveSubspaces was introduced as an improvement over ProtoNets. Such existing techniques attempt to generalize to new classes not seen in the existing training set.

As opposed to class generalizations, other authors have attempted to implement a label propagation process. For example, Zhou et al. introduced label propagation through diffusion in a semi-supervised learning setting if the data manifold is sufficiently smooth (see Literature Reference No. 5). More recently, several authors studied label propagation in feature space. For example, Iscen et al. constructed a k-nearest-neighborhood graph and propagated labels with a diffusion process (see Literature Reference No. 6). Further, Liu et al. constructed a neighborhood graph with a Gaussian similarity matrix to learn the parameters for label propagation in a meta-learning setting (see Literature Reference No. 7). Alternatively, Benato et al. described constructing a map from the feature space onto a t-SNE-generated 2-dimensional plane before propagating labels (see Literature Reference No. 8).

Although many methods for few-shot image classification have been attempted, the few-shot classification performance (with five or fewer labeled examples) for most problems remains too low. Such existing methods are simply not sufficiently reliable for real-world implementations.

Thus, a continuing need exists for a system and method for classifying images with only a few labeled examples that provides a high degree of accuracy for real-world applications.

SUMMARY OF INVENTION

The present disclosure provides a system for classifying images. In one aspect, the system comprises one or more processors and associated memory. The memory is a non-transitory computer-readable medium having executable instructions encoded thereon, such that upon execution of the instructions, the one or more processors perform several operations, including training a neural network with unlabeled images; extracting features with the neural network from both the unlabeled images and a set of labeled images to generate a feature space; propagating labels in the feature space using nearest neighbors; modeling a per-class simplified distribution in the feature space using kernel principal component analysis (KPCA); and classifying an object in a new test image using reconstruction error based on the per-class simplified distributions.

In another aspect, in propagating labels in the feature space, a fixed number of labels are iteratively added through a series of iteration steps.

Further, in each iteration step, only one unlabeled data point is added by finding, in the feature space, a point $x_j$ that is closest to any of the points $x_i$ in a set of labeled points, with the point x being added to the set of labeled points.

In yet another aspect, the neural network is trained with self-supervised learning.

In yet another aspect, the neural network is uploaded to a mobile platform, which allows the system to cause the mobile platform to perform a maneuver based on classification of an object.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7A is a table depicting experimental results of 5-way, 1-shot performance of linear fine-tuning, label propagation+ linear fine tuning (i.e., LP+Linear), and label propagation+ KPCA (i.e., LP+KPCA);

FIG. 7B is a table depicting experimental results of 5-way, 2-shot performance of linear fine-tuning, label propagation+ linear fine tuning (i.e., LP+Linear), and label propagation+ KPCA (i.e., LP+KPCA);

FIG. 7C is a table depicting experimental results of 5-way, 5-shot performance of linear fine-tuning, label propagation+ linear fine tuning (i.e., LP+Linear), and label propagation+ KPCA (i.e., LP+KPCA)

DETAILED DESCRIPTION

Figure 1:
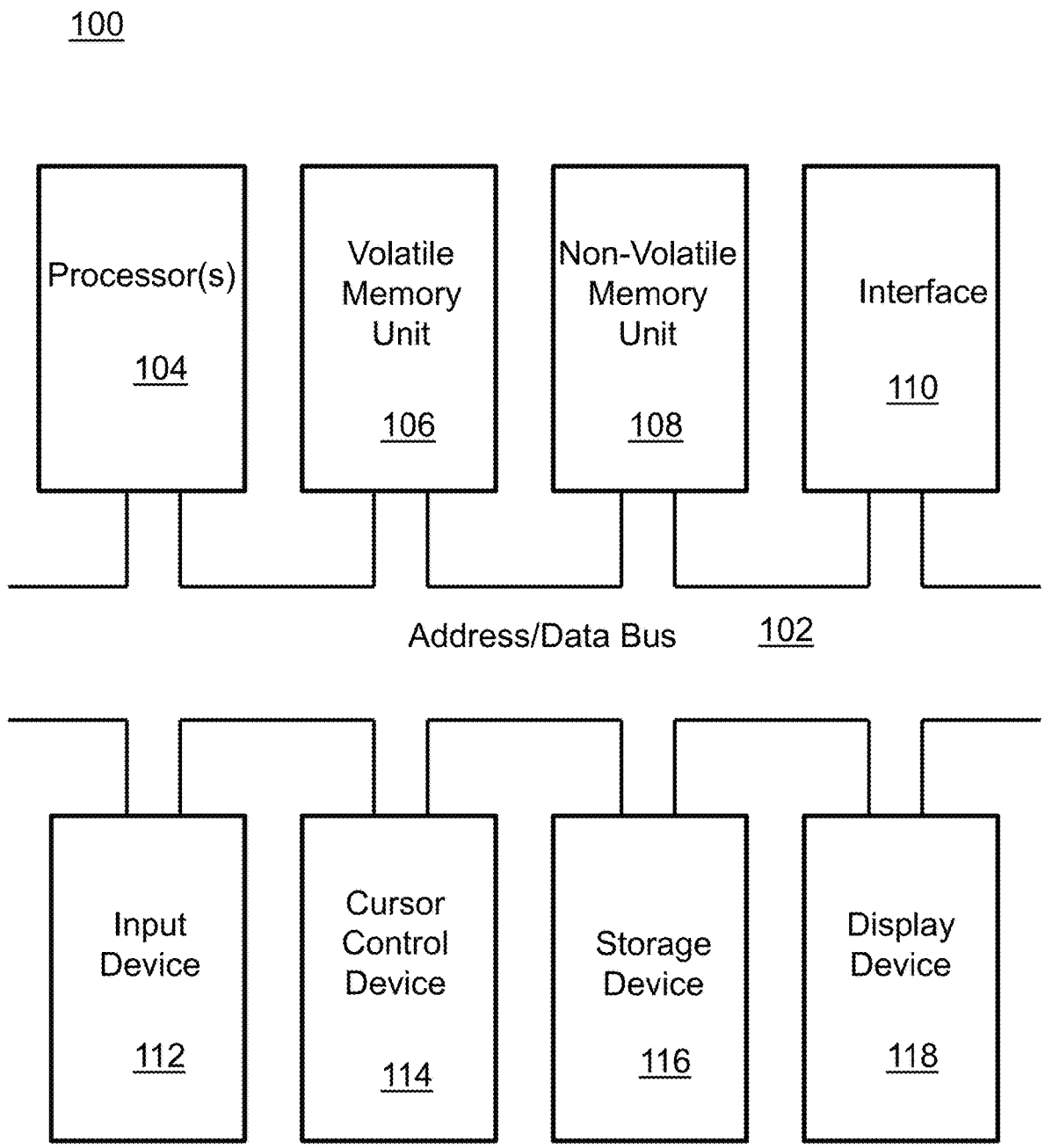
FIG. 1 is a block diagram depicting the components of a system according to various embodiments of the present invention.

The present invention relates to image classification and, more specifically, to a system for classifying images using a combination of nearest-neighbor-based label propagation and kernel principal component analysis. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112 (f). In particular, the use of "step of" or "act of" in the claims herein is not intended to invoke the provisions of 35 U.S.C. 112 (f).

Before describing the invention in detail, first a list of cited references is provided. Next, a description of the various principal aspects of the present invention is provided. Subsequently, an introduction provides the reader with a general understanding of the present invention. Further, specific details of various embodiment of the present invention are provided to give an understanding of the specific aspects. Next, experimental results are provided, following by example implementations.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Heiko Hoffmann. Kernel PCA for novelty detection. PatternRecognition, 40 (3): 863-874, 2007
2. Jake Snell, Kevin Swersky, and Richard S. Zemel. Prototypical networks for few-shot learning, 2017.
3. Christian Simon, Piotr Koniusz, Richard Nock, and Mehrtash Harandi. Adaptive subspaces for few-shot learning. In2020 IEEE/CVF Conference on Computer Vision and Pattern Recognition (CVPR), pages 4135-4144, 2020.
4. Oriol Vinyals, Charles Blundell, Timothy Lillicrap, Koray Kavukcuoglu, and Daan Wierstra. Matching networks for one shot learning. In D. Lee, M. Sugiyama, U. Luxburg, I.Guyon, and R. Garnett, editors, Advances in Neural Infor-mation Processing Systems, volume 29. Curran Associates, Inc., 2016.
5. Dengyong Zhou, Olivier Bousquet, Thomas Lal, Jason Weston, and Bernhard Scholkopf. Learning with local and global consistency. In S. Thrun, L. Saul, and B. Schoelkopf, editors, Advances in Neural Information Processing Systems, volume 16. MIT Press, 2004.
6. Ahmet Iscen, Giorgos Tolias, Yannis Avrithis, and Ondrej Chum. Label propagation for deep semi-supervised learning. In Proceedings of the IEEE/CVF Conference on ComputerVision and Pattern Recognition (CVPR), June 2019.
7. Yanbin Liu, Juho Lee, Minseop Park, Saehoon Kim, and YiYang. Transductive propagation network for few-shot learning. International Conference on Learning Representations, 2019.
8. Barbara Caroline Benato, Jancarlo Ferreira Gomes, Alexandru Cristian Telea, and Alexandre Xavier Falcao. Semi-supervised deep learning based on label propagation in a 2D embedded space. CoRR, abs/2008.00558, 2020.
9. Jianwei Yang, Pengchuan Zhang, Mei Gao, Bin Xiao, Xiyang Dai, Lu Yuan Li, Chunyuan, and Jianfeng Gao. Efficient self-supervised vision transformers for representation learning, 2021.
10. Mathilde Caron, Hugo Touvron, Ishan Misra, Herve Jegou, Julien Mairal, Piotr Bojanowski, and Armand Joulin. Emerging properties in self-supervised vision transformers, 2021.
11. Sylvain Gugger and Jeremy Howard. AdamW and Super-convergence is now the fastest way to train neural nets. 2 Jul. 2018.
12. Bernhard Schoelkopf, Alexander Smola, and Klaus-Robert Mueller. Nonlinear component analysis as a kernel eigenvalue problem. Neural Computation, 10:1299-1319, 1998.
13. Joseph F Comer, Philip L Jacobson, and Heiko Hoffmann. Few-Shot Image Classification Along Sparse Graphs. arXiv: 2112.03951v1, 7 Dec. 2021.

(2) Principal Aspects

Various embodiments of the invention include three "principal" aspects. The first is a system for classifying images. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms) can be associated with one or more associated memories, where each associated memory is a non-transitory computer-readable medium. Each associated memory can be associated with a single processor 104 (or device), or a network of interacting processors 104 (or devices), such as a network of autonomous platforms (e.g., autonomous vehicles, robots).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
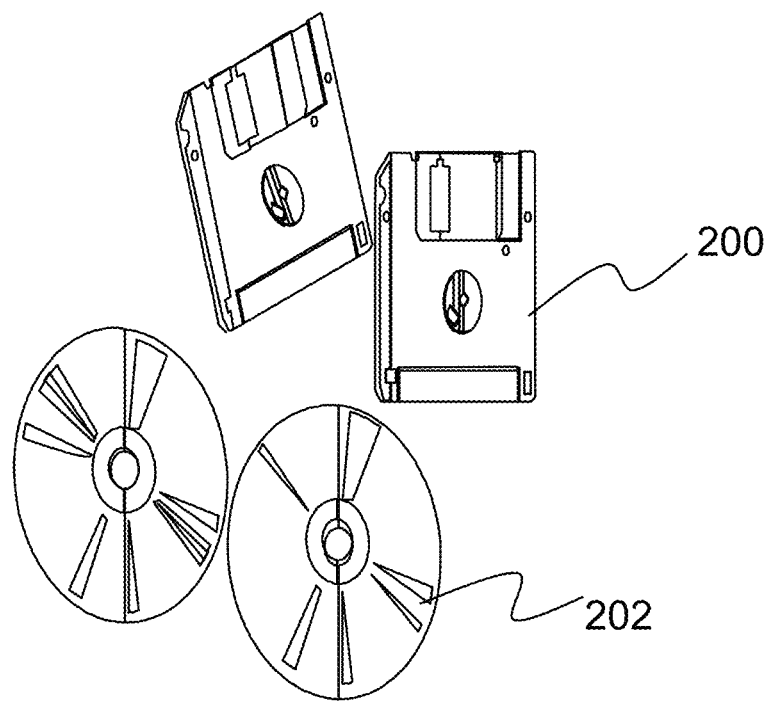
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The present disclosure provides a process for classification of images of objects using few labeled examples (few-shot classification). The process uses a neural network for extracting features from images, nearest-neighbor-based propagation of the few labels to unlabeled data in the feature space (the space of features produced by the application of the neural network to the dataset), and kernel principal component analysis (KPCA) (see Literature Reference No. 1) to create a decision boundary for the classification of the remaining or future unlabeled data according to a minimal reconstruction error. The system combines the existing methods of neural-network-based feature extraction, label propagation in feature space, and KPCA to produce a novel system for image classification which provides better few-shot performance on some datasets than the prior art.

The system is operable for detecting and classifying new patterns of objects and images for applications where labeled data is scarce. The process leverages on the discovery that labels that belong to the same object categories lie on a graph in the feature manifold space and use this discovery to propagate new labels when there are only a few annotations available (see Literature Reference No. 13). As evident below, the innovation has demonstrated state-of-the-art performance in classification accuracy and speed.

The system of the present disclosure improves upon existing nearest neighbor (NN)-based classification systems by taking advantage of empirically observed properties of the geometry of the space of features produced by NN applied to natural images. Namely, it is noted that the average within-class distance between features is roughly equal to that of the average all-classes distance between a given feature and all other features, making the feature space ill-suited to linear classification. Further it was observed that the probability is high that the nearest neighbor of a sample in feature space shares the class of that feature. Using such properties, the system of the present disclosure provides a significant performance boost over simple linear classification or linear classification paired with label propagation in the few-shot regime of five or fewer labels. The method provides classification accuracies as high as 93% on certain datasets with five labeled examples and provides a significant gain in performance over other state of the art few-shot learning methods. Further, kernel principal component analysis has never been employed for few-shot classification. Specific details are provided below.

(4) Specific Details of Various Embodiments

Figure 3:
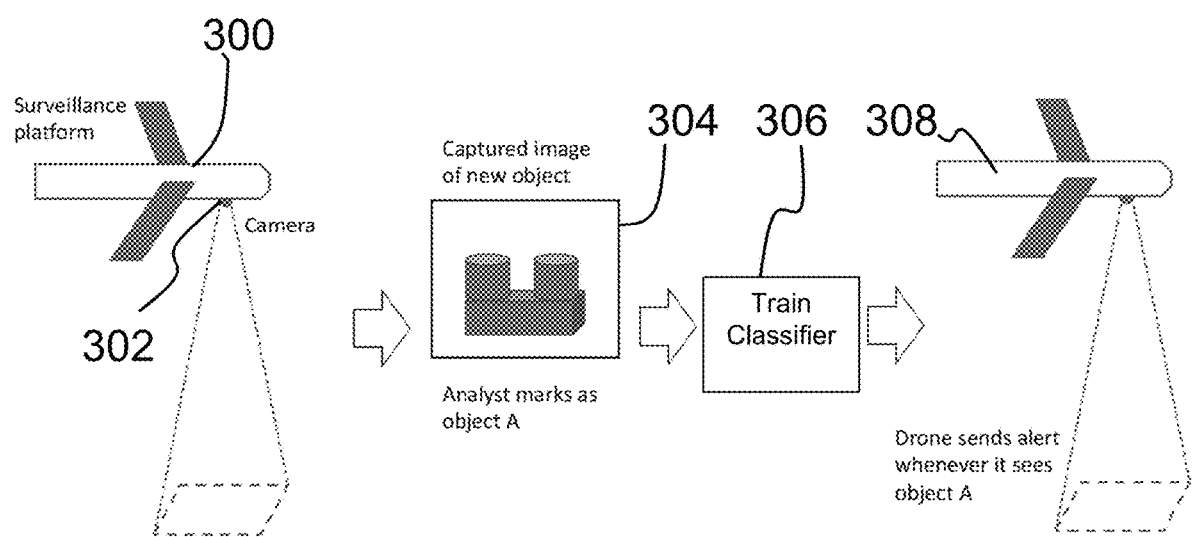
FIG. 3 is an illustration depicting an example application of the system according to an aspect of the present invention.

As noted above, the system of the present disclosure allows for classification of images of objects using few labeled examples. For illustrative purpose and a better understanding of the invention, FIG. 3 provides a non-limiting example of an application in which the system can be employed. In this example, the system is employed in a surveillance platform (e.g., unmanned aerial vehicle, etc.) 300. The surveillance platform 300 includes a camera 302 or other sensor that is operable for capturing and recording surveillance data (e.g., video or images from the Earth surface). The captured images 304 are then presented to a human analyst (e.g., on a computer screen, etc.). When the analyst sees a target of interest, he or she can mark the target (e.g., with a mouse pointer, eye tracker, etc.) and assign a label to it (e.g., by typing a word with a keyboard or speaking the word, etc.), thereby training 306 the classifier. Then, the system can learn from this single target example to classify new images. Generally, more than one labeled target example could be used for training. Once the classifier is trained, it can be deployed to the surveillance platform 308 (e.g., through a software upload). Then, the surveillance platform 308 can send an alert to a human operator whenever it detects the target in its video or image input. In use, multiple targets can be monitored simultaneously.

Figure 4:
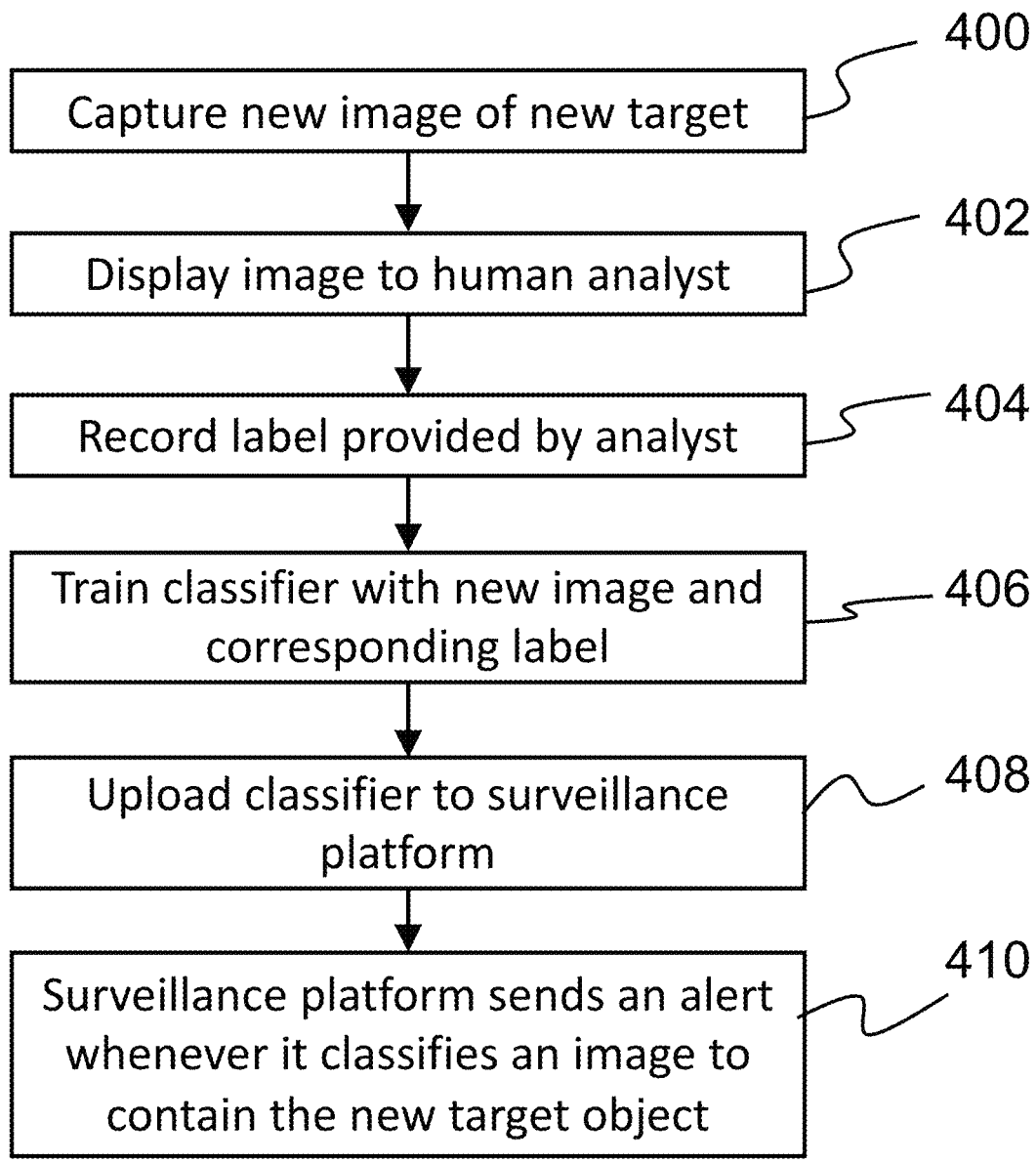
FIG. 4 is a flow chart depicting a process flow for using the system and method in a surveillance application.

For further understanding, FIG. 4 depicts the corresponding process flow chart. As shown, the platform in which the system is implemented captures 400 a new image of a target. The image is displayed 402 to an analyst. As a non-limiting example, the captured image 400 is sent via an upload to a satellite and downloaded or live streamed into a computer or other display device for viewing by the analyst. The analyst then records 404 a label for one or more objects (targets) in the image. The classifier is then trained 406 with the new target image and label, with the trained classifier thereafter being uploaded 408 into a platform (e.g., surveillance platform, video security system, autonomous vehicle, etc.) for use. Finally, the platform performs an operation 410 when it classifies an image to contain the new target object. Examples of such operations include sending an alert to an operator, causing the platform to maneuver (e.g., fly (turn, thrust, accelerate, etc.), driving (steer, accelerate, brake), etc.) to track and follow the new target object, causing the platform to project an item to intercept the target object. For example, there are applications such as autonomous aircraft refueling where drogue detection can use our image classification technique to project and intercept the hose with the basket. Other applications can be found in robotics and defense.

Training 406 the classifier requires three steps: Step 1) train a neural network with self-supervised learning, which does not require any labels and can be carried out as a preparatory step based on the raw surveillance images before an analyst annotates them; Step 2) use the labeled images to carry out label propagation, which automatically labels some of the unlabeled images; and Step 3a) compute KPCA for each set of labeled images for each class. To classify a new image, the KPCA reconstruction error (see, for example, Literature Reference No. 1) is computed with respect to each object class, and the image is classified as belonging to the class with the smallest reconstruction error (Step 3b).

Figure 5:
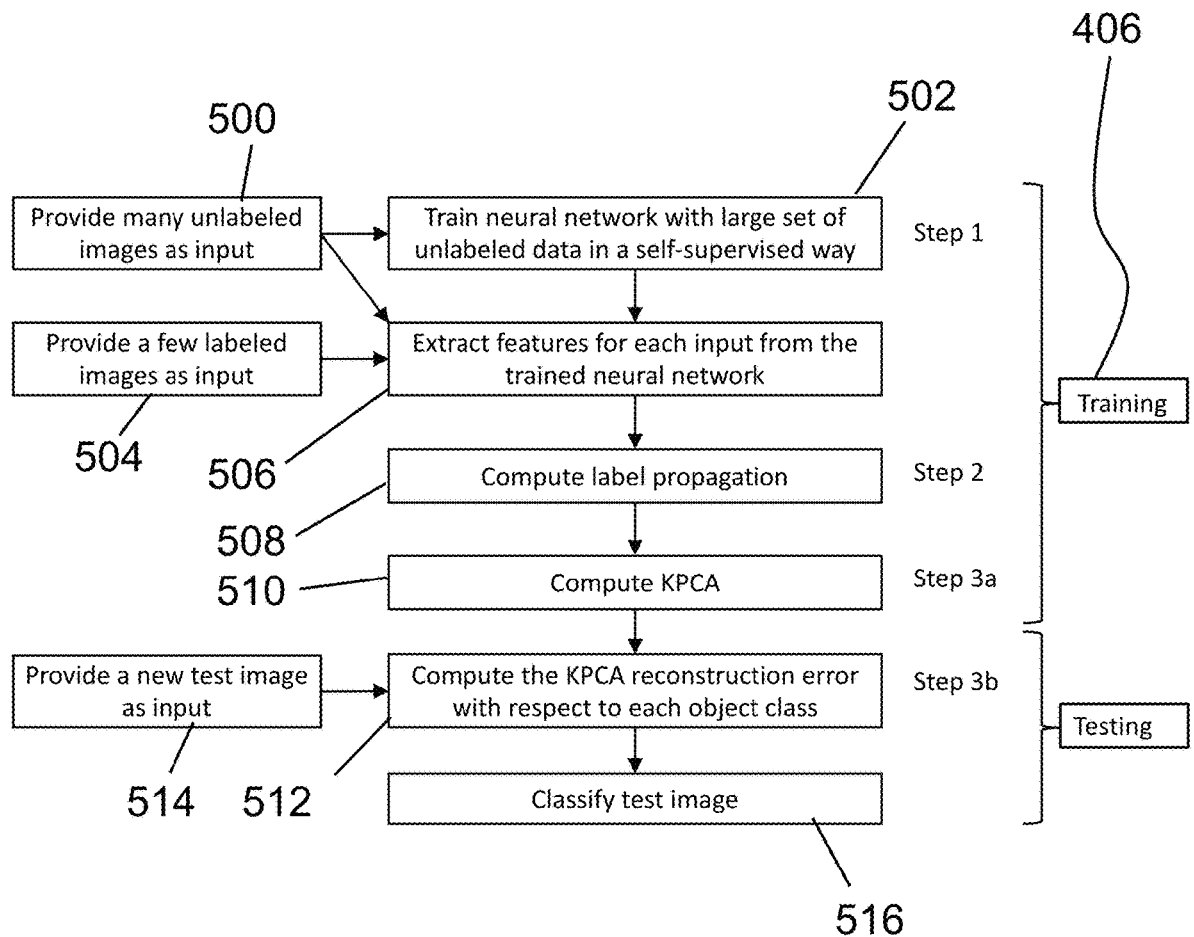
FIG. 5 is a flow chart depicting a process flow for classifier training and testing.

FIG. 5 depicts the training 406 process flow for the three steps, with further details below. Using unlabeled images as input 500, the first step involves training a neural network architecture 502 based on the Efficient Self-supervised Vision Transformers (EsViT) using a self-supervised loss as described in Literature Reference Nos. 9 and 10. In one desired embodiment, the system employs the tiny sliding window architecture ("Swin") as described in Literature Reference No. 9. A "student" Swin model is trained with the AdamW optimizer (see Literature Reference No. 11) while a "teacher" network's weights are updated as a weighted sum of the student network's previous weight values. Although not limited thereto, in one embodiment, the images are divided into non-overlapping 16×16 pixel patches and two additional ("global") random crops of size 224×224, all of which are subject to random transformations (augmentations) as described in Literature Reference No. 10. Although different learning rates can be employed, in one non-limiting embodiment, the system proceeds with a base learning rate of 0.0005 and cosine annealing, with a weight decay scaling linearly from 0.04 to 0.4 over 300 epochs. The network is trained for 300 epochs (or any other predetermined number) or until loss convergence. Given the unlabeled images 500 and/or labelled images 504 (e.g., labeled by an analyst), the system then extracts 506 features from each input. Thus, the trained network can map input images 500 and 504 onto feature vectors, which are an intermediate output of the neural network before a mapping onto class labels. The following steps operate in this feature space.

As noted above, Step 2 is directed to label propagation 508 in the feature space. For label propagation, the process iteratively adds a fixed number of extra labels (e.g., 4). As such, the system proceeds to propagate only into the neighborhood of the given labels, instead of diffusing into the entire unlabeled set. In each iteration step, only one unlabeled data point is added by finding, in feature space, the point $x_j$ that is closest (Euclidean distance) to any of the points $x_i$ in the set of labeled points, i.e., as follows:

$$j = \mathrm{argmin}_j \, \mathrm{min}_i \|x_i - x_j\|$$

Figure 6:
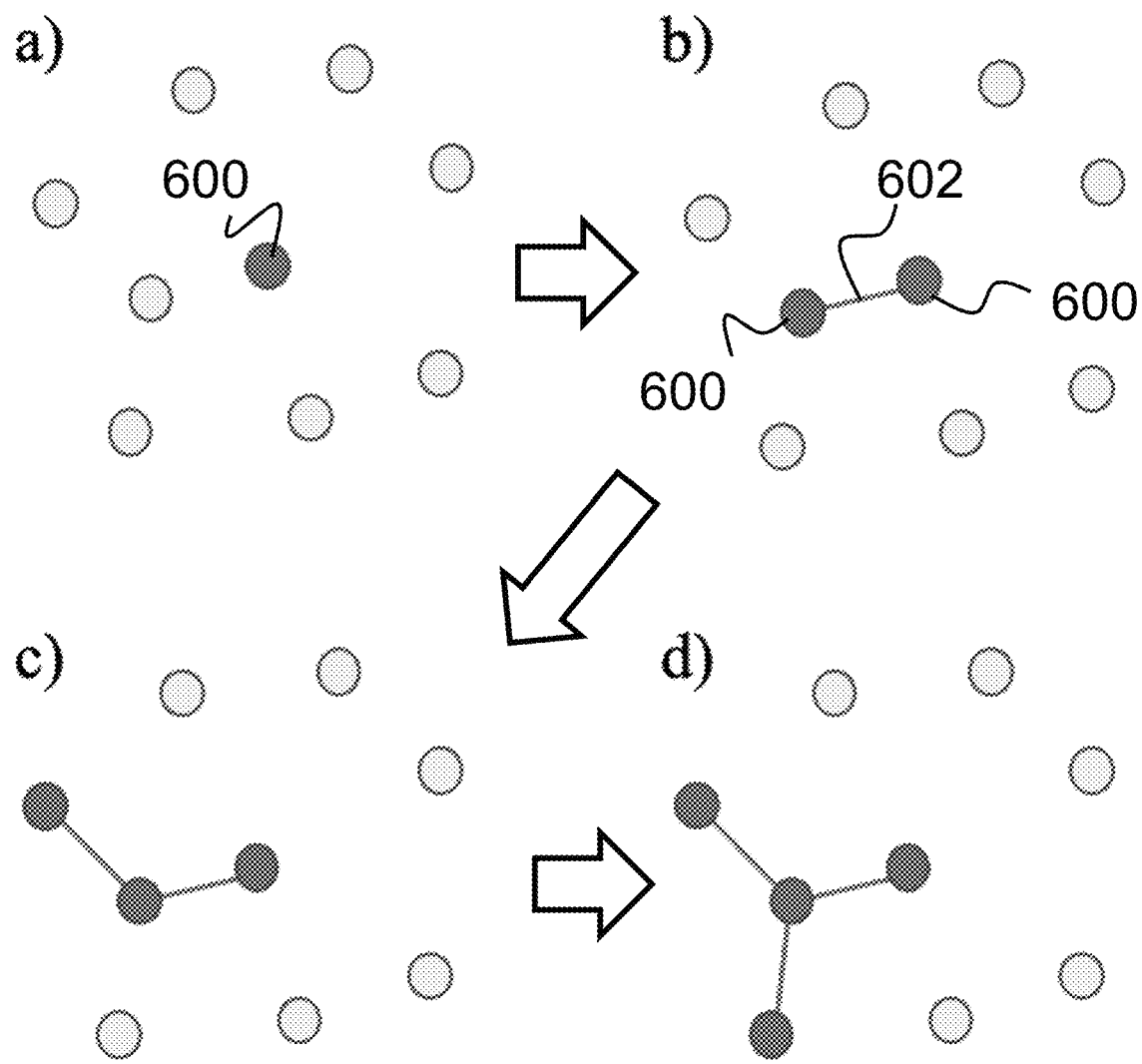
FIG. 6 is an illustration depicting an example sequence of label propagation.

The resulting $x_j$ is then added to the set of labeled points, and the iteration continues until a given number of points is added to the number of labeled points. FIG. 6 illustrates one example of this iterative process from (a) to (d), showing the addition of labeled points 600. Here, adding a nearest neighbor is shown as a link 602 in the graph between the labeled points 600 in the feature space.

Referring again to FIG. 5, Step 3 includes both a training part (Step 3a) and a testing part (Step 3b). In training, the collection of ground truth and pseudo labels ("augmented labels" through label propagation) are used to compute 510 the kernel matrix and its eigenvalues (see, for example, Literature Reference No. 12). Here, KPCA estimates a simplified model of the per-class distribution in the feature space. KPCA has two parameters, the width of the kernel function and the number of principal components. "Per-class simplified distribution" refers to a set of PCA kernels learned independently for each class label (e.g., cats, dogs, traffic lights, etc.). In the graphical context, "per-class simplified distribution" should be a set of branches that belong to the same class labels and ideally they are separated in the feature space. As a non-limiting example, a kernel function is a Gaussian function with width, σ=16, and an example for the number of principal components is to use 2/3 of the number of labels (groundtruth+augmentation). Since this value is generally a fraction, it can be converted by adding 0.5 and rounding to the nearest integer.

In testing (i.e., Step 3b), the KPCA reconstruction error is computed 512 for a test image 514 (in the feature space) with respect to the KPCA (kernel matrix and eigenvalues) for each class of image labels. The KPCA reconstruction error can be determined using any suitable method, a non-limiting example of which is described in Literature Reference No. 1. The classifier assigns to the new image the class (i.e., classifies the test image 516) for which this reconstruction error is the least between different classes. For example, the reconstruction error is computed for each class, where the total number of class labels is fixed. In this case, the minimum reconstruction value is used between the fixed number of classes. Thus, the system can be employed on a mobile platform (e.g., as shown in FIG. 3) or other platforms and effectively classify objects within a scene in real-time.

(5) Experimental Results

Experiments were conducted to confirm the performance benefits of the system of the present disclosure. In this aspect, a graph detection network was trained using the steps as described above and depicted in FIG. 5 and on several benchmark image classification and few-shot datasets, including RESISC45, CropDisease, and EuroSat. For each dataset, the present method was compared against two baselines: linear classification of features and label propagation followed by linear classification of features. The standard n-way, k-shot paradigm was used with n=5 and k=1,2,5. In n-way, k-shot classification, a "task" was constructed by sampling n classes uniformly at random from a dataset which had at least n classes. For each of the n classes for that task, k samples were provided, with labels, for training of a classifier. The resulting classifier was tested on the remaining (unlabeled) data points from the n classes for that task. Each method was evaluated over 1000 random tasks. The results are shown in Tables 1, 2, and 3 depicted in FIGS. 7A through 7C, respectively. Specifically, Table 1 depicts the results of 5-way, 1-shot performance of linear fine-tuning, label propagation+linear fine tuning (i.e., LP+Linear), and label propagation+KPCA (i.e., LP+KPCA). Note that the results for LP+KPCA are for those using the system of the present disclosure. Table 2 depicts the results of 5-way, 2-shot performance of linear fine-tuning, label propagation+linear fine tuning (i.e., LP+Linear), and label propagation+KPCA (i.e., LP+KPCA), while Table 3 depicts the same process, with the exception of it being 5-shot performance. Collectively, the tables show that the accuracy results using the process of the present disclosure exceed those of the prior art techniques, with the exception of the EuroSat dataset as shown in Tables 1 and 3. This may be because the images that are in Eurosat are from a different domain than the images that were used to train the EsViT feature (which was the ImageNet dataset). When the source and target domains are too far, the label propagation loses the trace of the kernel that was tried to be a part of the same label. Thus, it is clear that the process and system of the present disclosure is a marked improvement over the prior art for use cases for similar domains.

(6) Example Applications

Figure 8:
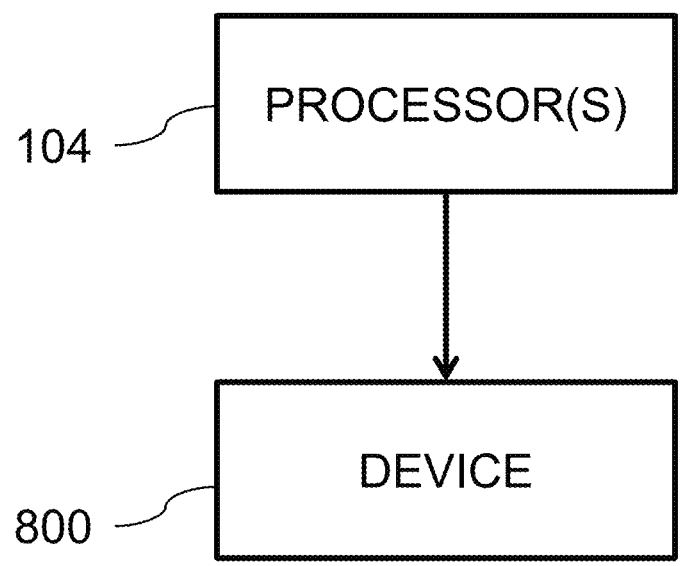
FIG. 8 is a block diagram depicting control of a device according to various embodiments.

As noted above, there are several applications in which the system of the present invention can be applied. For example, the system can be implemented into surveillance applications (such as on a mobile platform or camera surveillance system), or on autonomous mobile platforms. In such examples, the platform in which the system is implemented can be caused to move or otherwise operate based on the classification. Thus and as shown in FIG. 8, the one or more processors 104 may be used to control a device 800 (e.g., a mobile device display, a virtual reality display, an augmented reality display, a computer monitor, a motor, a machine, a drone, a camera, etc.) based on classifying the object. The processors 104 can be the same processor performing the training/classification operations above or networked or otherwise be in communication with the classifier to receive the classifications and then control the device 800 based on the classification.

The device 800 may be controlled to cause the device to move or otherwise initiate a physical action based on the discrimination and localization. For example, in some applications, a drone may be caused to steer and/or maneuver to track and follow the classified object (e.g., for example, the system can be programed to fly/drive/etc. and follow an Object A whenever Object A is observed in a scene). In yet some other embodiments, a camera may be controlled to orient towards the classified object. In other words, actuators or motors are activated to cause the camera (or sensor) to move or zoom in on the location where the object is localized within a scene. In yet another aspect, if a system is seeking a particular object and if the object is not determined to be within the field-of-view (FOV) of the camera (i.e., no object classified within the FOV), the camera can be caused to rotate or turn to view other areas within a scene until the sought-after object is classified as within the FOV.

Another non-limiting example includes autonomous vehicle applications. For instance, if the system determines that a classified object (e.g., a pedestrian) is within the driving path of the vehicle, the system described herein can cause a precise vehicle maneuver for collision avoidance by controlling a vehicle component. For example, appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for classifying images, the system comprising:
   one or more processors and associated memory, the memory being a non-transitory computer-readable medium having executable instructions encoded thereon, such that upon execution of the instructions, the one or more processors perform operations of:
   training a neural network with unlabeled images;
   extracting features with the neural network from both the unlabeled images and a set of labeled images to generate a feature space;
   propagating labels in the feature space using nearest neighbors;
   modeling a per-class simplified distribution in the feature space using kernel principal component analysis (KPCA); and
   classifying an object in a new test image using reconstruction error based on the per-class simplified distributions.

2. The system as set forth in claim 1, wherein in propagating labels in the feature space, a fixed number of labels are iteratively added through a series of iteration steps.

3. The system as set forth in claim 2, wherein in each iteration step, only one unlabeled data point is added by finding, in the feature space, a point $x_j$ that is closest to any of the points $x_i$ in a set of labeled points, with the point $x_j$ being added to the set of labeled points.

4. The system as set forth in claim 3, wherein training the neural network is performed with self-supervised learning.

5. The system as set forth in claim 4, further comprising an operation of uploading the neural network to a mobile platform.

6. The system as set forth in claim 5, further comprising an operation of causing the mobile platform to perform a maneuver based on classification of an object.

7. The system as set forth in claim 1, further comprising an operation of uploading the neural network to a mobile platform.

8. The system as set forth in claim 7, further comprising an operation of causing the mobile platform to perform a maneuver based on classification of an object.

9. The system as set forth in claim 1, wherein training the neural network is performed with self-supervised learning.

10. A computer program product for classifying images, the computer program product comprising:
    a non-transitory computer-readable medium having executable instructions encoded thereon, such that upon execution of the instructions by one or more processors, the one or more processors perform operations of:
    training a neural network with unlabeled images;
    extracting features with the neural network from both the unlabeled images and a set of labeled images to generate a feature space;
    propagating labels in the feature space using nearest neighbors;
    modeling a per-class simplified distribution in the feature space using kernel principal component analysis (KPCA); and
    classifying an object in a new test image using reconstruction error based on the per-class simplified distributions.

11. The computer program product as set forth in claim 10, wherein in propagating labels in the feature space, a fixed number of labels are iteratively added through a series of iteration steps.

12. The computer program product as set forth in claim 11, wherein in each iteration step, only one unlabeled data point is added by finding, in the feature space, a point $x_j$ that is closest to any of the points $x_i$ in a set of labeled points, with the point $x_j$ being added to the set of labeled points.

13. The computer program product as set forth in claim 10, further comprising an operation of uploading the neural network to a mobile platform.

14. The computer program product as set forth in claim 13, further comprising an operation of causing the mobile platform to perform a maneuver based on classification of an object.

15. The computer program product as set forth in claim 10, wherein training the neural network is performed with self-supervised learning.

16. A computer implemented method for classifying images, the method comprising an act of:
- causing one or more processors to execute instructions encoded on a non-transitory computer-readable medium, such that upon execution, the one or more processors perform operations of:
  - training a neural network with unlabeled images;
  - extracting features with the neural network from both the unlabeled images and a set of labeled images to generate a feature space;
  - propagating labels in the feature space using nearest neighbors;
  - modeling a per-class simplified distribution in the feature space using kernel principal component analysis (KPCA); and
  - classifying an object in a new test image using reconstruction error based on the per-class simplified distributions.

17. The method as set forth in claim 16, wherein in propagating labels in the feature space, a fixed number of labels are iteratively added through a series of iteration steps.

18. The method as set forth in claim 17, wherein in each iteration step, only one unlabeled data point is added by finding, in the feature space, a point $x_j$ that is closest to any of the points $x_i$ in a set of labeled points, with the point $x_j$ being added to the set of labeled points.

19. The method as set forth in claim 16, further comprising an operation of uploading the neural network to a mobile platform.

20. The method as set forth in claim 19, further comprising an operation of causing the mobile platform to perform a maneuver based on classification of an object.

21. The method as set forth in claim 16, wherein training the neural network is performed with self-supervised learning.

\* \* \* \* \*